(12) United States Patent
Nakash

(10) Patent No.: US 8,724,452 B2
(45) Date of Patent: May 13, 2014

(54) TECHNIQUE FOR PROTECTING COMMUNICATION TRAFFIC IN A CONNECTION HAVING REDUNDANCY

(75) Inventor: Shell Nakash, Kfar Sava (IL)

(73) Assignee: ECI Telecom Ltd., Petach-Tikva (IL)

( * ) Notice: Subject to any disclaimer, the term of this patent is extended or adjusted under 35 U.S.C. 154(b) by 208 days.

(21) Appl. No.: 13/339,038

(22) Filed: Dec. 28, 2011

(65) Prior Publication Data
US 2012/0170449 A1 Jul. 5, 2012

(30) Foreign Application Priority Data
Dec. 30, 2010 (IL) .......................................... 210375

(51) Int. Cl.
*H04L 12/26* (2006.01)
*H04L 12/28* (2006.01)

(52) U.S. Cl.
USPC ............ 370/218; 370/244; 370/225; 370/221

(58) Field of Classification Search
USPC ......... 370/216, 225, 217, 218, 221, 228, 242, 370/244
See application file for complete search history.

(56) References Cited

U.S. PATENT DOCUMENTS

| 7,558,194 | B2 * | 7/2009 | Regan et al. ................... 370/217 |
| 7,782,764 | B2 * | 8/2010 | Zi ................................. 370/218 |
| 7,961,599 | B2 * | 6/2011 | Proulx ........................... 370/218 |
| 7,969,866 | B2 * | 6/2011 | Khan et al. .................... 370/216 |
| 8,331,220 | B2 * | 12/2012 | Kitada .......................... 370/217 |
| 8,503,329 | B2 * | 8/2013 | Mullooly et al. .............. 370/254 |
| 8,625,412 | B2 * | 1/2014 | Voit et al. ....................... 370/225 |
| 2006/0047851 | A1 | 3/2006 | Voit et al. |
| 2007/0242604 | A1 * | 10/2007 | Takase et al. .................. 370/223 |
| 2009/0274155 | A1 | 11/2009 | Nakash |
| 2010/0226246 | A1 * | 9/2010 | Proulx .......................... 370/228 |
| 2011/0194404 | A1 * | 8/2011 | Kluger et al. ................. 370/218 |
| 2011/0310730 | A1 * | 12/2011 | Kini et al. ..................... 370/225 |
| 2012/0147737 | A1 * | 6/2012 | Taylor et al. .................. 370/219 |

FOREIGN PATENT DOCUMENTS

WO WO 2011/021180 2/2011

OTHER PUBLICATIONS

P. Muley and M. Aissaoui, "Pseudowire (PW) Redundancy", Internet-Draft draft-ietf-pwe3-redundancy-03.txt, May 2010, retrieved from: http://tools.ietf.org/html/draft-ietf-pwe3-redundancy-03.

* cited by examiner

*Primary Examiner* — Ahmed Elallam
(74) *Attorney, Agent, or Firm* — Novick, Kim & Lee, PLLC; Harold L. Novick; Jae Youn Kim

(57) ABSTRACT

A technique for protecting traffic in a Layer 2 (L2) communication network between a first and a second local nodes (CE1, CE2) interconnected via a redundant dual homed structure, the technique comprises a) distributing the traffic in the dual homed structure in a fault-free state, to form two traffic flows between the CE1 and CE2; b) providing Layer 2 (L2) fault indications for the dual homed structure, in the form of operation and maintenance (OAM) tools, c) in a faulty state of the dual homed structure, forwarding traffic packets at the provider edges of the structure, based only on conventional physical fault indications and L2 fault indications, by locally making forwarding decisions for selecting an active communication line via the redundant dual homed structure.

9 Claims, 5 Drawing Sheets

(1) FAILURE HANDLING
WEST TO EAST

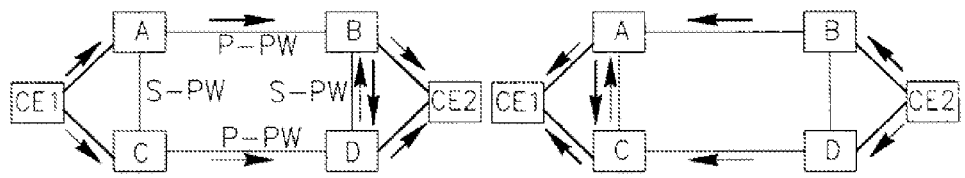
(A) NORMAL FLOW
WEST TO EAST
FIG. 7A
(B) NORMAL FLOW
EAST TO WEST
FIG. 7B
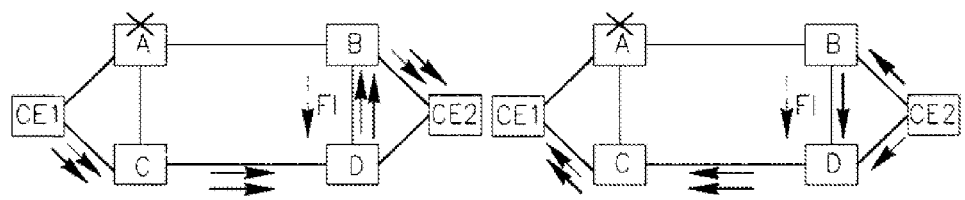
(I) FAILURE HANDLING
WEST TO EAST
FIG. 7C
(I) FAILURE HANDLING
EAST TO WEST
FIG. 7D
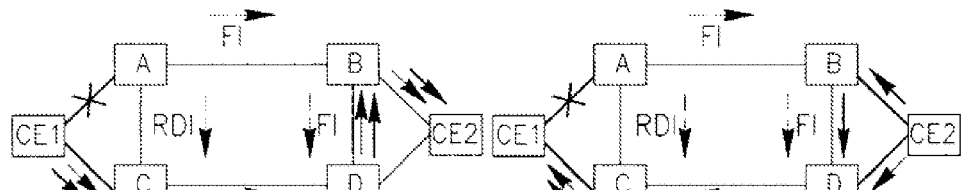
(II) FAILURE HANDLING
WEST TO EAST
FIG. 7E
(II) FAILURE HANDLING
EAST TO WEST
FIG. 7F
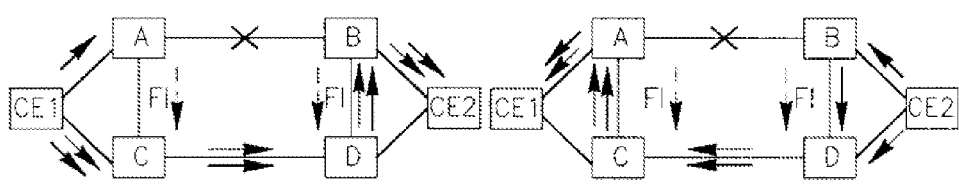
(III) FAILURE HANDLING
WEST TO EAST
FIG. 7G
(III) FAILURE HANDLING
EAST TO WEST
FIG. 7H

TECHNIQUE FOR PROTECTING COMMUNICATION TRAFFIC IN A CONNECTION HAVING REDUNDANCY

CROSS-REFERENCE TO RELATED APPLICATIONS

This application claims priority to Israel Application No. IL 210375 filed Dec. 30, 2010, the disclosure of which is incorporated by reference herein in its entirety

FIELD OF THE INVENTION

The present invention relates to a technique for protected connectivity between layer 2 (L2) communication networks using connections with redundancy, and more particularly to a technique for redundant pseudowire connectivity for L2 virtual private networks (VPNs).

BACKGROUND OF THE INVENTION

L2 Network

A L2 network (abbreviated network) is composed of L2 bridges (a.k.a., L2 switches, switches) connecting local area networks (LAN) or IEEE 802.1Q virtual LAN (VLAN) segments containing end stations. A switch forwards L2 frames (packets) among its interfaces (ports) based on L2 media access control destination address (MAC DA) carried by each packet. A switch performs address learning based on L2 MAC source address (MAC SA) carried by each packet, a procedure referred to as MAC learning or Address Learning into a so called MAC database. When a switch receives a packet with a known unicast (UC) DA (i.e., one it has previously learned as SA), it would forward the packet to the port from which it learned the address. Otherwise, when the DA is unknown unicast (has not been learned) or multi-destination (multicast, MC, or broadcast, BC) it would forward a packet copy (a.k.a., MC replica) to all the ports, an action referred to as flooding. A port may belong to multiple LANs, known as virtual LANs (VLANs), where address learning and forwarding is based on L2 address combined with VLAN indications carried by the packets.

A service provider may map the customer traffic into Provider Service VLANs (SVLANs) using VLAN stacking techniques (so called Q-in-Q encapsulation) in order to partition traffic of one customer from another.

Multipoint-to-Multipoint (MP) VPNs

A virtual private LAN service (VPLS) emulates the functionality of a LAN, making it possible to interconnect multiple remote access networks via a common service provider network, a.k.a., multipoint-to-multipoint (MP) connectivity, wherein all the access networks behave as a single LAN or VLAN. With VPLS, all these access networks would be assigned the same L2 virtual private network (VPN) identifier. This is analogous to assigning them the same SVLAN in an Ethernet-based provider network. For convenience, we will refer to both SVLAN and VPLS as MP VPNs. VPLS generally performs better than SVLANs. With VPLS, Ethernet packets arriving from the access network node (called, customer equipment, CE) are encapsulated in multi-protocol label switching (MPLS), based on which they are forwarded across the provider network towards the remote sites. Utilizing MPLS enables to build networks that excel in performance, quality of service (QoS) for service differentiation, traffic engineering (TE) for optimal utilization of network resources, high resiliency (particularly fast rerouting, FRR), and scalability.

VPLS architecture implements full mesh connectivity between the provider edge (PE) nodes that connect the customer access networks, this allows each access network to communicate with any other access network belonging to the same VPN. Each PE-PE path (a.k.a., L2 pipe) carrying VPN traffic is called a pseudo-wire (PW). A PW carries bidirectional traffic of a single VPN. When multiple VPNs are needed per physical link, each VPN should have its own PW flowing in parallel with the PWs.

Since there is a PW between any two PEs, a PE receiving a packet from PW must not forward it on another PW, or else the destination PE might receives two packet copies. This is referred to as split horizon rule.

An alternative to using Ethernet-VLAN for connecting a CE to provider's network is to classify customer traffic to specific VPN, the connection is so-called spoke pseudowire (spoke PW). With this method, known as hierarchical VPLS (H-VPLS), Ethernet packets already arrive encapsulated with MPLS headers over the connection to the provider network. Spoke PWs are not subject to the split horizon rule, i.e., a PE receiving a packet from VPLS PW can forward it on spoke PW and vice versa. H-VPLS is potentially preferred over either Ethernet or VLAN (Ethernet-VLAN) owing to its MPLS properties.

Point-to-Point (P2P) VPNs

A virtual private wire service (VPWS) emulates the functionality of a leased line, making it possible to interconnect two remote sites or CEs via an intermediate network. This service is referred to as point-to-point (P2P) VPN.

Like VPLS, a P2P VPN uses a PW to carry traffic across the service provider's network. It may also use H-VPLS to connect the sites to the service provider's PEs. The main advantage of P2P VPNs over MP VPNs is a reduction in complexity and cost of managing many connections. Unlike MP VPNs, there is no need to perform MAC address learning, because all the traffic arriving from one site should be delivered to the other site. Disabling MAC learning saves processing effort thereby boosting switch performance.

Redundancy

An important feature in packet-based applications is effective redundancy, which enables fault-tolerant and reliable networks. A particular case of interest is fault tolerant connectivity between a CE to service provider's network, wherein the CE is dual homed to the provider network PEs (sometimes, referred to as gateway PEs) via two connections in the form of Ethernet-VLAN or H-VPLS spokes, such that when one connection fails, the remaining connection serves for carrying the traffic.

One aspect of redundancy is avoiding L2 loops, where traffic traverses a PE or CE more than once. When a loop is not avoided, traffic would keep on circulating in the network and may either never arrive to its destination or be returned to the sender CE.

Objectives for Dual Homed Connectivity

The target MP VPN topology shown in FIG. 1 is composed of a full mesh interconnection among N sites, two of which are shown (site m and site n). Each site consists of a CE (say, CEm) that is dual homed to two PEs (PEm1 and PEm2). A split horizon rule is maintained, so that traffic that arrives to site n from site m, would not be relayed to another site (say, site p). For each two sites m and n, 4 bidirectional communication lines (PWs in this example) are established: (1) PEm1 to PEm2, local line (2) PEn1 to PEn2, local line (3) PEm1 to PEn1 distant line (4) PEm2 to PEn2 distant line. There are also local connections CEm to PEm1, CEm to PRm2, CEn to PEn1 and CEn to PRn2.

Note that some sites may prefer not to have redundancy (e.g., in order to save costs), at which case the PEm2 and PEn2 along with their connection would be removed.

The target P2P VPN topology shown at FIG. 2 is composed of two sites only, yet the components of these sites and their PW connectivity are the same as those of FIG. 1.

A partially redundant connectivity as shown at FIG. 3 is referred to as "3-Config", where the CEn at site n is single or dual homed to PEn, compared to the two PEs (PEn1 and PEn2) at FIG. 1 and FIG. 2. This topology is less resilient because if PEn fails, CEn would lose connectivity with remote sites (site m). It is sometimes used because it requires less devices, connections, and PWs.

The objectives are listed below:
- (A1) Supporting the topologies of FIG. 1-FIG. 3. That is, redundant PW connections for either P2P or MP VPN, protecting against a failure of either PE or CE-PE connection while avoiding L2 loops. A failure of a PW due to defects in the provider network (e.g., fiber optics cut) need not be covered: it is the network operator's responsibility to deploy protection mechanisms (e.g. MPLS fast reroute) while designing the network.
- (A2) It should be possible to concurrently use the redundant connections of the CE to PEs for carrying traffic, in order to maximize usage of connection capacity, rather than leaving some connections unused (a.k.a., standby state). Solutions where normally only one of the CE-PE connections is active while the other is inactive (a.k.a, "standby"), thereby typically providing half as much traffic capacity, are not acceptable.

At FIG. 2, CE should be able to use load balancing over PEm1 and PEm2, and would switchover all traffic to PEm2 (PEm1) when the connection to PEm1 (PEm2) fails.
- (A3) No protocol/signaling/message exchange (hereafter, protocol) should be required between devices (PE to PE or PE to CE) to coordinate correct operation. Particularly, the PEs of FIG. 1-FIG. 3 should not need protocols to exchange information in order to coordinate active and standby PWs, i.e. which PW(s) should carry traffic and which ones should block it.
- (A4) The discussion will be limited to a single point of failure per pair of sites, i.e. at any time only one CE-PE connection or a PE could fail per pair of sites, though some multi-failure scenarios may also be recoverable using same rules. However: (1) For MP VPN, a failure at one pair of sites should not prohibit recovery at another different pair of sites. At FIG. 4, where only the P-PWs are shown, after PEm1 of site pair (m,n) and PEk2 of site pair (k,p) fail, then traffic between sites m and n should be completely recovered, as well as traffic between sites k and p (2) A failure should be handled without disturbance to unrelated CEs. Particularly, when a CE-PE connection (CEm-PEm1 at FIG. 1) or PE (PEm1) fails, the CE (CEn) at any remote sites should be unaware of the failure and would continue normal operation. Further, when a PW (m1-n1 at FIG. 1) fails, any CE should be unaware of the failure and would continue normal operation. FIG. 4 illustrates an example of configuration with recoverable concurrent failures.
- (A5) Recovery following a failure of a PE, or a PW, or a CE-PE connection should be automatic and fast, that is, completed in a short time (sub-second).
- (A6) The solution should be realizable with PW (Ethernet-VLAN) as PE-PE (CE-PE) connection, respectively. However, non-PW realizations may also be possible, e.g., Ethernet-VLAN for PE-PE or PW for CE-PE, where OAM between PEs could be realized using the so-called Connectivity Fault Management (CFM) per IEEE 802.1ag.

PRIOR ART DOCUMENTS

There have been proposed several methods for fault tolerant connections between L2 devices and networks:
(1) US 2006/0047851 (further referred as Cisco's) proposes a method at which a local node u-PE is dual homed to two local nodes Agg-PEs and can communicate with remote nodes u-PE in a loop-free manner, wherein all of the involved local/remote u-PEs and Agg-PEs run a common xSTP protocol in order to break the L2 loop. This method uses a (rather heavy) protocol and therefore fails to meet objective A3.
(2) draft-ietf-pwe3-redundancy-03.txt describes a few PW redundancy scenarios, along with methods for how to deal with them. It relies on putting one of the CE-PE connections (AC) down, and therefore fails to meet objective A2. It also uses protocol(s) and therefore fails to meet objective A3.

Section 3.2 further describes a scenario "without any PW redundancy functions", which does not rely on PW redundancy but instead the CEs "implement native service protection switching". At FIG. 5, when PEm1 fails, CEm and CEn would switchover traffic to PEm2 and PEn2, respectively, thereby recover traffic. This method does not support the topology at FIG. 3 where CEn is single homed to PEn, because when CEm to PEm1 fails, CEn could do nothing to restore traffic that goes from CEn to CEm via PEn and PEm1. This method further does not meet objective A4, as exemplified at FIG. 6, where only the P-PWs are shown: when PEm1 of site m fails it causes CEn and CEp of the remote sites to switchover traffic towards PEn2 and PEp2, respectively (a PW exist between PEn1 and PEk1). If now PEk2 fails, site k would be totally disconnected.

Section 3.3 describes another scenario, which again requires coordination of forwarding via one type of messaging: "the T-PE nodes would advertise 'Active' for the forwarding status based on the priority", and another type of messaging "to have T-PE1 and T-PE2 synchronize the transmit and receive path of the PW over the network".

Section 3.4 deals with a case where the MTU (CE) uses PW to connect to the PE. An MTU uses a protocol with which it "communicates the status of its member PWs". This method also fails to meet objective A2 because "MTU-s needs to choose only one of the spoke PWs (active PW) to one of the PE to forward the traffic". Furthermore, a CCN messaging is required to "generate MAC Withdraw Messages to trigger MAC flushing within the H-VPLS full mesh", or else objective A5 would not be met, as the mis-forwarding would continue a long time (minutes by default) till a self auto flushing of addresses would occur at remote sites.

Section 3.5 describes a ring scenario, xSTP protocol and further message exchanges among sites are used "to maintain a loop free connectivity of PW groups . . . and it is desirable to block the group at PE2 by virtue of exchanging the PW preferential status as Standby".

Section 3.6 is another scenario, now dealing specifically with MP VPNs. It requires a protocol to decide on a primary and a secondary PE within a site ("only one n-PE in each access network is serving as a Primary PE"), where only the primary PE is sending traffic. It further requires a protocol between the PEs of different sites, to coordinate a single active PW and avoid unnecessary replications of traffic: "n-PEs can disseminate the status of PWs active/standby among themselves and furthermore to have it tied up with the redundancy mechanism such that per VPLS instance the status of active/backup n-PE gets reflected on the corresponding PWs emanating from that n-PE".

Section 5 provides a summary statement of the need for a protocol and recommends to embed it in LDP: "This document expects extensions to LDP that are needed for protecting pseudo-wires". therefore, whoever wants to interoperate with remote sites per one or more of the scenarios, would have to implement the LDP protocol.

(3) US2009274155 AA (Technique for Providing Interconnection between Communication Networks) and the Inventor's WO 2011/021180 (Dual Homing technique for Layer 2 networks) use dual homing approaches that require a protocol between the gateway PEs and therefore fail to meet objective A3. It further deactivates one of the CE-PE connections at any given time and therefore fails to meet objective A2.

OBJECT OF THE INVENTION

The object of the present invention is providing a technique for fault tolerant L2 connectivity, that would address all the objectives listed above.

SUMMARY OF THE INVENTION

The above object can be achieved by the technique which will be described below and claimed at the end of the description.

First of all, the Inventor has proposed the following new features/conditions for solving the problem, which were briefly mentioned above as objectives A2 and A3.

A2: The Inventor has proposed to initially distribute traffic in the dual homed structure into two traffic flows between source and destination nodes, by concurrently using the redundant connections of the CE to PEs for carrying the two traffic flows via the dual homed connection, and thus to maximize usage of connection capacity, rather than leaving some connections unused (a.k.a., standby state). This can be done, say, by CE applying the so called link aggregation or load balancing means, where it normally subdivides the traffic stream to two sub-streams, e.g. based on MAC DA and SA pairs or TCP sessions. Note that PEs need not be required to implement any load balancing, rather the load balancing is done by the CE. Only upon a failure of a PE or a CE-PE connection, should the CE associated with the failed element be required to switchover all the traffic to the healthy connection (remaining at the discussed CE).

The idea to distribute traffic in the dual homed configuration allows organizing both the monitoring of the dual homed structure members, and the rearrangement of traffic in a much simpler manner; the way of doing it will be further described.

A3: The Inventor proposes that no protocol/signaling/message exchange (hereafter, protocol) be required between devices (PE to PE or PE to CE) to coordinate their correct operation.

For example, the PEs of FIG. 1-FIG. 3 would not need to exchange information in order to coordinate active and standby PWs, i.e. which specific PW or PWs should carry traffic and which ones should block it.

An example for such an undesired protocol is the label distribution protocol (LDP), which is exchanged by switches to dynamically establish and maintain PWs, contrary to "static"

MPLS networks where PWs are configured by a network management system (NMS). Implementing a quite complicated protocol like LDP just for the sake of assuring loop-free fault-tolerant topology is highly undesired.

Another example for messaging is the Customer Change Notification (CCN) defined at draft-ietf-12vpn-vpls-bridge-interop-04.txt, a.k.a., MAC flushing or MAC withdrawal messaging. The CCN is required after topology changes (e.g., PEm1 fails at FIG. 1) and the other PE (PEm2) is then used to carry traffic. All other remote sites are not aware of the switchover and would send traffic to remote CE (CEm) via the failed PE1, and therefore would never reach CEm as PEm is down. The CCN message causes the remote sites to flush the MAC address databases, and thereafter start flooding packets intended to remote CE (CEm) till they re-learn the addresses. MAC flush messaging is standardized as part of LDP extensions, and would therefore require the undesirable LDP in order to interoperate.

Another example for a protocol is the spanning tree protocol (STP), which is designed to assure a loop free connectivity. STP along with its variants like RSTP, are next abbreviated as xSTP. The need to maintain xSTP interaction among the PEs poses a provisioning and maintenance burden, especially when the sites run under different administration entities.

The following exception occurs: for the purpose of this application, operation and maintenance (OAM) tools at the PW level or at the MPLS tunnel (carrying multiple PWs in parallel) level, i.e., at L2 level, shall be allowed. This is reasonable as these tools are intended to monitor the health of the PW or tunnel using so called "keep-alive" or "continuity check" packets, rather than to coordinate their usage for loop-free topology, and are commonly supported at both dynamic and static networks. The OAM tools may be enhanced in order to achieve a fast recovery, e.g., by using a small period between consecutive OAM packets, or by expediting the transmission of a defect indication upon failure detection.

The Inventor has taken advantage of the OAM tools, thus saving implementation efforts.

The proposed L2 OAM tools comprise such fault indications as FI (fault indication) and RDI (remote defect indication) and are used in a dual homed structure (the use which was never proposed before) in a non-standard manner, for processing thereof at PEs and making conclusions about failure of specific elements of the dual homed structure, thus allowing to avoid using special protocols between PEs. The manner of utilizing the L2 OAM tools will be shown in detail with reference to various failure scenarios shown in FIGS. 7A-7H.

The proposed method may be referred to as "distributed redundancy of communication lines" (in particular—"distributed PW redundancy"), in the sense that each PE in the dual homed structure makes packet forwarding decisions locally, without a need to coordinate a single active communication line (PW) with the other PEs by protocols.

According to a first aspect of the invention, the Inventor proposes:

A method for handling traffic in a Layer 2 (L2) communication network between a first and a second local nodes (CE1, CE2) interconnected via a redundant dual homed structure, wherein said structure comprising the following members: four provider edge nodes PEs, four communication lines and four local connections, a first pair of provider edge nodes (PEs A,C) being respectively connected by a first couple of local connections (CE1-PEs A,C) to a first local node (CE1), a second pair of provider edge nodes (PEs B,D) respectively connected by a second couple of local connections (CE2-PEs B,D) to a second local node (CE2), two distant communication lines (P-PW) each interconnecting two provider edge nodes PEs belonging to different pairs, and two local communication lines (S-PW) each interconnecting two provider edge nodes PEs belonging to the same pair;

the traffic is initially distributed in the structure into two traffic flows, thereby offering traffic load balancing in the dual homed structure;

the method is based on protocol-free (messaging free), local selection of active communication lines by a specific PE in the dual homed structure (and consequently, on forwarding of packets by a specific PE), based only on conventional physical fault indications which always exist in the dual homed structure and on Layer 2 (L2) indications in the form of OAM tools which are especially provided in the structure.

The OAM tools whose L2 indications are, for example, fault indication (FI) AND remote defect indication (RDI), are generated and interpreted in a non standard manner, and are used to reflect failures at the dual homing structure in addition to the functions which the OAM tools were originally designed to. Examples of interpretation of the L2 OAM indications will be presented in the detailed description in scenarios of failures.

The L2 fault indications (in the form of OAM tools) reflect failures of the dual homing structure, and may be processed by PEs at Layer 2 (L2) to which belong, for example, such networks and connections as pseudo wires PW, MPLS networks, Ethernet networks and connections.

As has been mentioned, the method comprises initially dividing the traffic, say at the first local node CE1, into two traffic flows and respectively carrying thereof via the first couple of local connections, whenever said first couple and said first pair of provider edge nodes PEs remain functional.

This feature allows distributing the traffic in a fault-free dual homed structure so as to allow respectively carrying two component traffic flows via an upper and a lower symmetric portions of the dual homed structure, and further rearranging the traffic in case of a failure. It also enables load balancing between the local connections.

More specifically, the method may comprise:
a) in a fault-free state, carrying traffic from the first local node CE1 to the second local node CE2 by dividing it into the two traffic flows at the first local node CE1 for load balancing and respectively carrying the two flows via the first couple of local connections, via provider edge nodes PEs of said first pair, via said two distant communication lines, via provider edge nodes PEs of said second pair and via the second couple of local connections, while carrying two said flows via both provider edge nodes PEs of said second pair (and preferably in mutually opposite directions via the suitable, second local communication line), thus allowing both provider edge nodes PEs of said second pair to learn the same MAC addresses
b) in a faulty state, when a failure occurs in at least one element of a group comprising a local connection CE1-PE and a provider edge node PE:
propagating the Layer 2 fault indications (L2 OAM tools) in the dual homed structure and processing thereof at the PEs so that as a result of said failure, the failed element, the remaining element of the group associated with it and also the local and the distant communication lines associated with said PE element of the group become blocked for said two traffic flows in the dual homed structure, while a specific one of said first and second local nodes CE1 and CE2, being remote from the failure, remains unaware of the failure;
performing switching at the local node (preferably, at the node—for example CE1—being closer to the failure), so that both said two flows are directed to unblocked members of the dual homed structure, and
rearranging said traffic flows based on the Layer 2 fault indications, so as to bypass all said blocked members of the dual homed structure by utilizing the remaining ones to carry both of said flows;
both of the flows arriving from the first local node CE1 to the second local node upon the mentioned failure, pass through both provider edge nodes PEs associated with the second local node CE2 in case they are both functional, in order to allow the PEs to learn the same MAC addresses (from this point of view, the situation remains as it was described for the non-faulty state in a).

The method thereby allows said local node being remote from the failure, as well as all other local nodes in the network (if interconnected with said local node), to remain unaware of the failure, and thereby to continue forwarding the traffic normally.

As mentioned above, in the non-faulty state the method preferably comprises carrying two said flows via provider edge nodes PEs of said second pair in mutually opposite directions, so that said two flows are crossed once in the redundant structure, and thereby allowing both provider edge nodes PEs of said second pair to learn the same MAC addresses It should be noted that if there is no crossing of the traffic flows in the normal state in one of the local lines, the method will be effective only for point0 to point (p2p) VPNs. For multipoint (mp) VPNs, without the crossing, there could be undesired flooding.

The Inventor is proposing the following rules for the dual homed connectivity and forwarding packets therein.

Rules (R1) A PE would have a primary PW (P-PW, a distant communication line)—and a mate secondary PW (S-PW, a local communication line), per remote site. A PE may forward a given packet to either P-PW or S-PW, however in no case would a PE replicate a packet towards both PWs, as these packets could both reach the remote CE.

(At FIG. 1 and FIG. 2, PEm1 has one PW towards PEn1 and another PW towards PEm2. As shall be described later, the former PW would be primary and the latter would be secondary).

(R2) A PE receiving traffic from CE/P-PW/S-PW would normally, in the absence of failure, forward it to P-PW/S-PW/CE, respectively.

(Sending traffic from P-PW to S-PW enables the peer PE of S-PW to learn all addresses received from remote site)

(R3) CE monitors the health of the local connections to PEs. Normally, in the absence of failure, the CE would apply load balancing over the two connections, per objective A2. Upon a connection failure or a PE failure, CE would switchover all traffic to the remaining active connection. These failures may be detected using physical layer mechanisms, which are usually very fast.

(R4) PE monitors the health of the local PWs and would react upon a failure of peer PE to recover traffic, as described next. Per objective A3 this monitoring may be done using OAM.

(R5) When a PE fails, the peer PE of the P-PW would sense that by the absence of periodic OAM over the PW and respond as follows:
- The peer PE would regard the P-PW faulty ("Down", contrary to "Up")
- The peer PE would send a fault indication (FI) over the mate S-PW. This indication may be sent using OAM, though other means could be used.
- The peer PE would then start sending traffic to remote site over the mate S-PW.

(At FIG. 1 and FIG. 2, when PEm1 fails, PEn1 would sense that by the absence of OAM, regard the PW as faulty, send FI over the S-PW towards PEn2, and start using the S-PW when sending traffic to site m).

(R6) When a CE-PE connection fails, the PE would send a fault indication (FI) over the P-PW, and a remote defect indication (RDI) over the S-PW. Alternatively, instead of FI and RDI, the PE may stop sending periodic OAM over the P-PW and S-PW. In both cases, the peer PE of P-PW would respond to the FI as described by rule R5.

(At FIG. 1 and FIG. 2, when CEm to PEm1 fails, PEm1 would send FI over the P-PW towards PEn1 and RDI over the S-PW towards PEm2.)

(R7) When a PE receives FI over S-PW, it would start forwarding any traffic arriving from S-PW to remote site via P-PW.

(This rule is void when the PE is both sending and receiving FI over S-PW, as that would mean both P-PWs towards remote site are regarded as faulty.)

(R8) When a PE receives RDI over S-PW or detects that the S-PW is faulty (by the absence of periodic OAM), it would start forwarding traffic arriving from P-PW to CE.

MAC Address Learning (Multipoint MP Virtual Private Networks VPN Only)

(R9) A packet that is forwarded to PW (CE) must be a known unicast UC associated with this PW (CE), or a multicast MC replica generated by the local PE. For VPLS network, split horizon rules must be followed, wherein a PE receiving traffic from a remote site should not forward it to another remote site.

(R10) A PE receiving a new address (MAC SA) from CE/P-PW/S-PW would normally, in the absence of failure, associate the address with the suitable CE/P-PW/P-PW, respectively.

Associating the address received over S-PW with the suitable P-PW may be done by either of:
- (R10-a) Listing the address as if it was learned from P-PW. This alternative is more vulnerable to OAM packet loss and delays.
- (R10-b) Listing the address as if it was learned from S-PW, but actually forwarding traffic as if packet was learned from P-PW. In this case, the addresses should be flushed whenever the Rx (receiving) FI condition over the S-PW changes from ON (fault-state) to OFF (fault-free) and vice versa (R11) When a PE receives FI over its S-PW, it would start associating new addresses arriving from it with the local CE. Associating the address is as described for rule R10.

There is also proposed a software product comprising computer implementable instructions and/or data for carrying out the described method, stored on an appropriate non-transitory computer readable storage medium so that the software is capable of enabling operations of said method when used in a computer system. The software must be installed in control units of the provider edge nodes PEs, thereby providing each of the PEs with rules for selecting active communication lines and forwarding packets.

Still further, there is proposed a dual homed structure adapted for implementing the described method. Also, there is provided a dual homed structure provided with the proposed software product.

BRIEF DESCRIPTION OF THE DRAWINGS

The invention will be further described with reference to the following non-limiting drawings, in which:

FIGS. 7A-7H show normal and failure scenarios for the proposed technique.

DETAILED DESCRIPTION OF EXEMPLARY AND PREFERRED EMBODIMENTS

Figure 1:
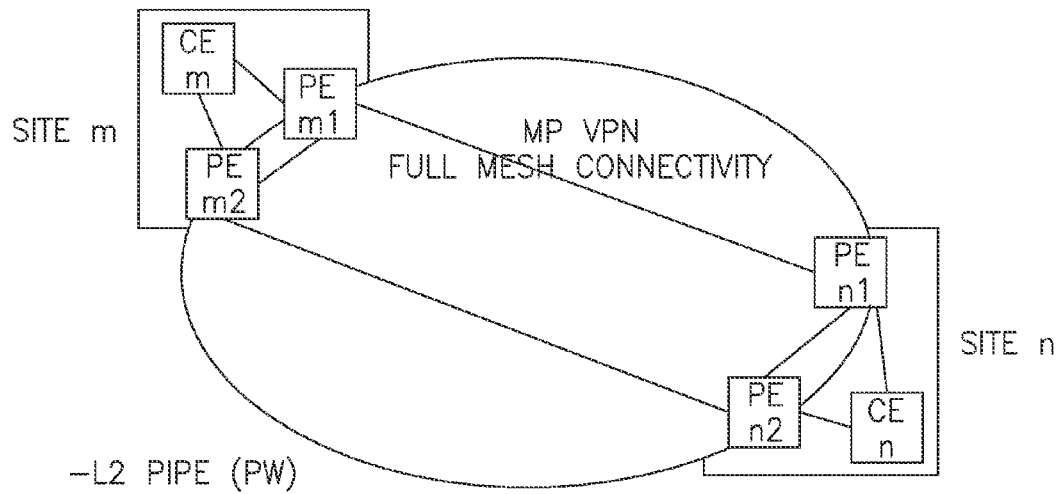
FIG. 1 shows a target MP VPN topology for which the inventive technique is proposed.

FIGS. 7A-7H illustrate scenarios of operation of a dual homed redundant structure under failure of one of its elements. Thin lines show pseudo-wires PW, fatter lines show CE to PE connections (local connections) created via VLAN or Ethernet.

FIGS. 7A-7H illustrate some of possible scenarios for the target topology, where CE1 (CE2) is dual homed to PE-A (abbrev. A) and C (B and D), respectively. A-B and C-D are P-PWs while the A-C and B-D are S-PWs. Traffic flow is described next.

(a) Normal Traffic Flow West to East:
Per rules R2 and R3:
- Packet sourced at CE1 ("West" side) is sent using load balancing to both A and C.
- A (C) forwards the packet over P-PW to B (D), respectively.
- B (D) forwards the packet directly to CE2 ("East" side), respectively.

(b) Normal Traffic Flow East to West:
Packet flow is similar to that described for case (a), but in the opposite directions. Note that per rule R10, B does not forward traffic to S-PW, as it associates any new address received from it, with the P-PW.

(i) PE Down
When PE1 fails, this is locally detected by the CE1, e.g., based on physical layer indications.
Per rule R3, CE1 would switchover the traffic towards C.
Per rule R5, B would detect that the P-PW is faulty (by the absence of periodic OAM), and send FI over S-PW to D.
Per rule R7, D would start forwarding all traffic arriving from S-PW to C.
Per rule R8, C would start sending traffic arriving from P-PW directly to CE1.
Per rule R10-b for MP VPN, D would optionally flush the addresses learned from S-PW.

Per rule R11 for MP VPN, D would start associating new addresses arriving from S-PW with CE2.

West to East:
- Packet sourced at CE1 is sent to C.
- C forwards the packet over P-PW to D.
- D forwards the packet to B.
- B forwards the packet directly to CE2.

East to West:
- Packet sourced at CE2 is sent using load balancing to both B and D.

Per objective A4, CE2 is unaware of the failure between CE1 and A, and continues normal operation.
- B forwards the packet over S-PW to D.
- D forwards the packet from either B or CE2 to C.
- C forwards the packet directly to CE1.

PE Repaired

When PE1 is repaired:
- CE1 would no longer avoid sending traffic to A.
- B would stop sending FI over S-PW.
- Per rule R10-b for MP VPN, D would optionally flush the addresses learned from S-PW.

Then traffic would resume normal flow per (a), (b).

(ii) CE-PE Down

When the connection CE1 to A fails, it is locally detected by the endpoints devices CE1 and PE1, e.g., based on physical layer indications:

Per rule R6, A would send FI over P-PW to B and RDI over the S-PW to C.

Behavior per rules R3, R5, R7, R8, and R11 are as described for case (i)

Packet flow is the same as described for case (i)

CE-PE Repaired

When the connection CE1 to A is repaired:
- CE1 would no longer avoid sending traffic to A.
- A would stop sending FI (RDI) over P-PW (S-PW) to B (C)
- B would stop sending FI over S-PW to D.
- Per rule R10-b for MP VPN, D would optionally flush the addresses learned from S-PW.

Then traffic would resume normal flow per (a), (b).

(iii) P-PW Down

The scenario (iii) is added for failure of a distant communication line. Such a failure can be resolved as shown, by applying the same rules as the above-mentioned failures. Moreover, the technique of the invention fully recovers a multi-failure scenario where all of these elements concurrently fail: CE1-A, A, distant line A-B, B, and B-CE2, and similarly recovers when these elements concurrently fail: CE2-C, C, distant line C-D, D, and D-CE2.

In spite of objective A1 not necessitating the need to cover a failure of P-PW, this failure may actually be recovered using the same set of rules, as described below.

When P-PW A-B fails:

Per rule R5, A (B) would detect that the P-PW is faulty (by the absence of periodic OAM), send FI over S-PW to C (D), and start sending traffic to remote site over the S-PW, respectively.

Per rule R7, C (D) would start forwarding all traffic arriving from S-PW to D (C), respectively.

Per rule R10-b for MP VPN, C and D would optionally flush the addresses learned from S-PW.

Per rule R11 for MP VPN, C (D) would start associating new addresses arriving from S-PW with CE1 (CE2), respectively.

West to East:
- Packet sourced at CE1 is sent using load balancing to both A and C. (two arrows of different thickness should be seen, going from CE1 to A and C respectively)
- A forwards the received packet over S-PW to C.
- C forwards the packet from either A or CE1 to D.

East to West:
- Packet sourced at CE2 is sent using load balancing to both B and D (similar to above)
- B forwards the packet over S-PW to D (similar to above)
- D forwards the packet from either B or CE2 to C.

P-PW Repaired

When P-PW A-B is repaired:
- A and B would stop sending FI over S-PW.
- Per rule R10-b for MP VPN, C and D would optionally flush the addresses learned from S-PW.

Then traffic would resume normal flow per (a), (b).

MAC flush: Upon PW status change (FI set/reset, Up/Down), flush all addresses learned on it.

Figure 8:
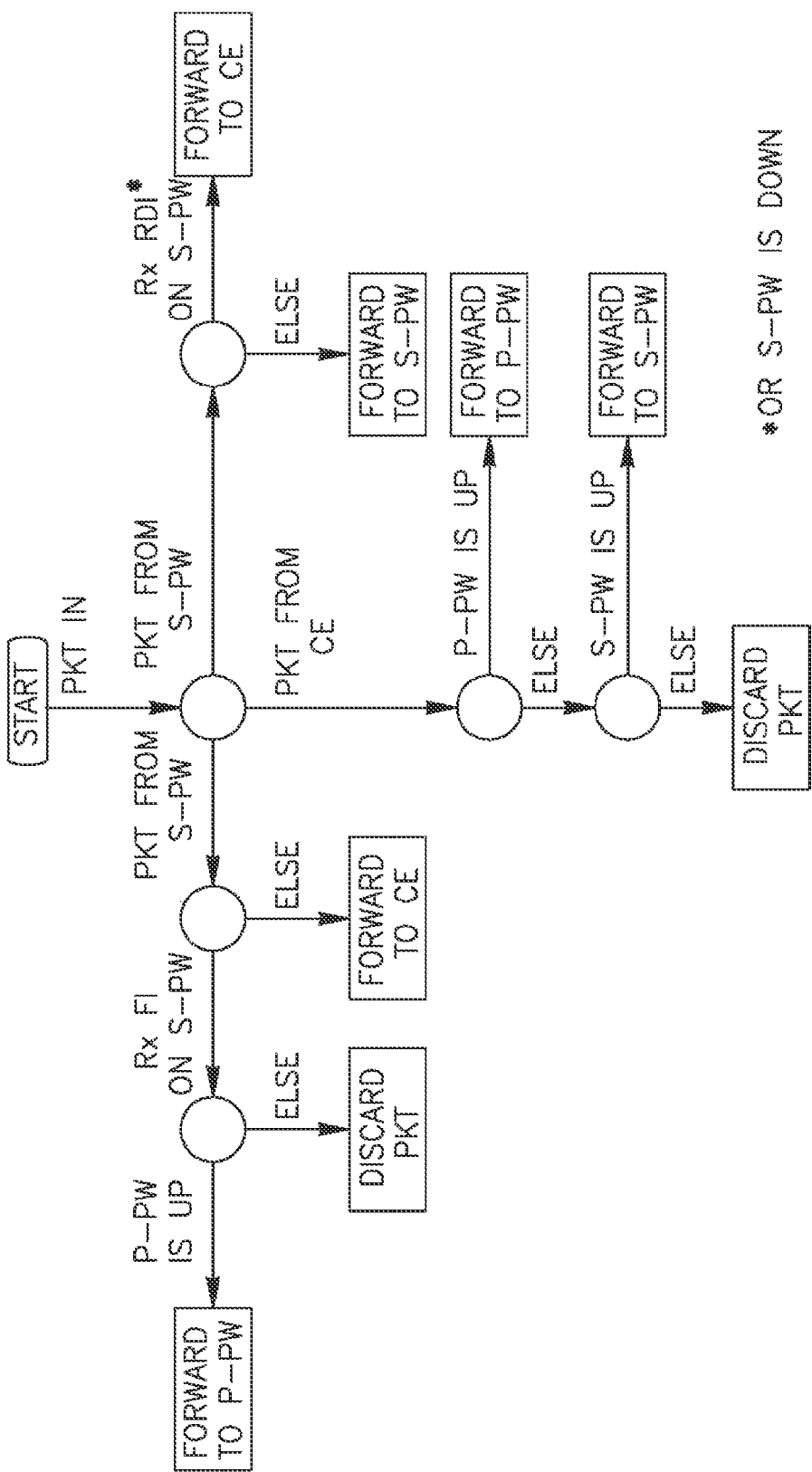
FIG. 8 illustrates a proposed algorithmic scheme of PE Forwarding Rules.
Figure 9:
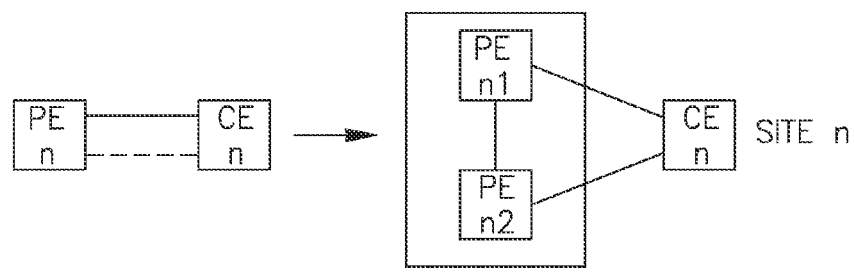
FIG. 9 shows transforming of a partially redundant dual homing to a conventional dual homing structure.

FIG. 8 illustrates a general algorithmic scheme of PEs Forwarding Rules (for any of the PEs). Together with the following text, FIG. 8 summarizes how packets are forwarded by PEs in the proposed technology. The black circles are logical operators. It should be emphasized, that each of the PEs makes its forwarding decisions based only on physical fault indications+L2 fault indications being OAM tools, locally and without any protocol for interacting with other PEs for choosing an active path for traffic packets.

- Packet arriving from CE is forwarded to P-PW when functional ("Up"), otherwise to S-PW when Up, else is discarded.
- Packet arriving from P-PW is forwarded to S-PW, unless when Rx RDI condition exists over the S-PW (or is it otherwise down), at which case it is forwarded to the CE.
- Packet arriving from S-PW while there is FI condition on S-PW, is forwarded to P-PW when Up, else is discarded.
- Packet arriving from S-PW while there is no Rx FI condition on S-PW, is forwarded to CE.
- Address learning: a packet's MAC DA is associated to the PW or CE from which it arrived.
- Address learning: when PE starts (stops) sending Tx FI over S-PW it moves all the addresses learned from P-PW (S-PW) to the mate S-PW (P-PW), respectively.

Meeting the Objectives

This section describes how the proposed solution meets the objectives.

Figure 2:
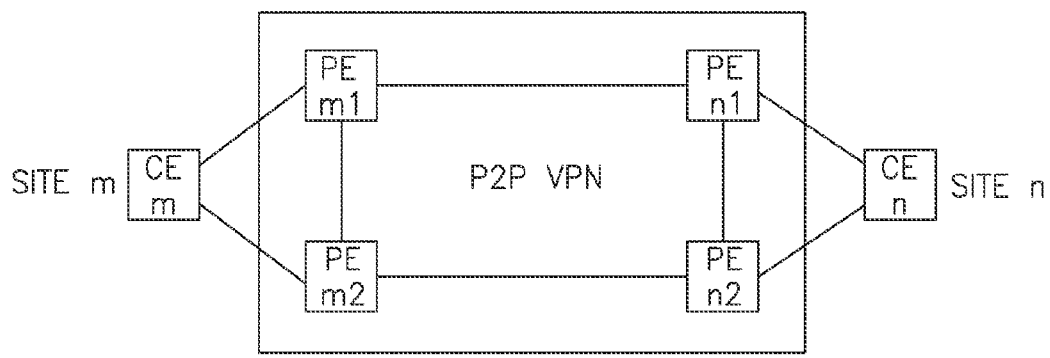
FIG. 2 shows a target P2P VPN topology for which the inventive technique is proposed.
Figure 3:
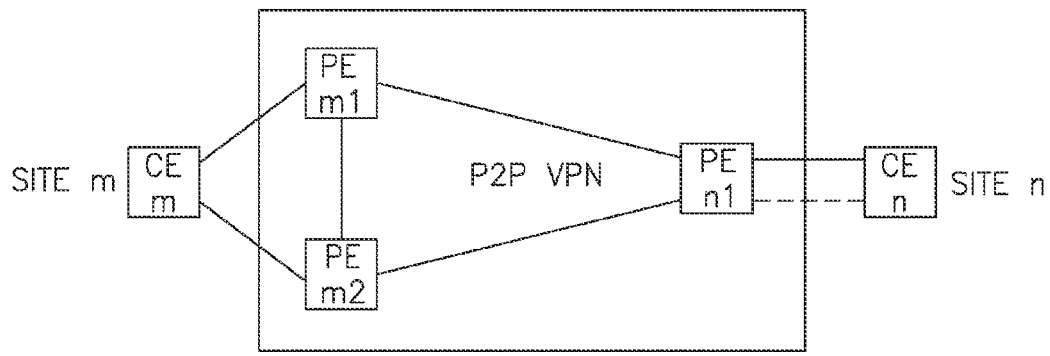
FIG. 3 shows a partially redundant connectivity ("3-Config") being a version of a regular four-node dual homed configuration.
Figure 4:
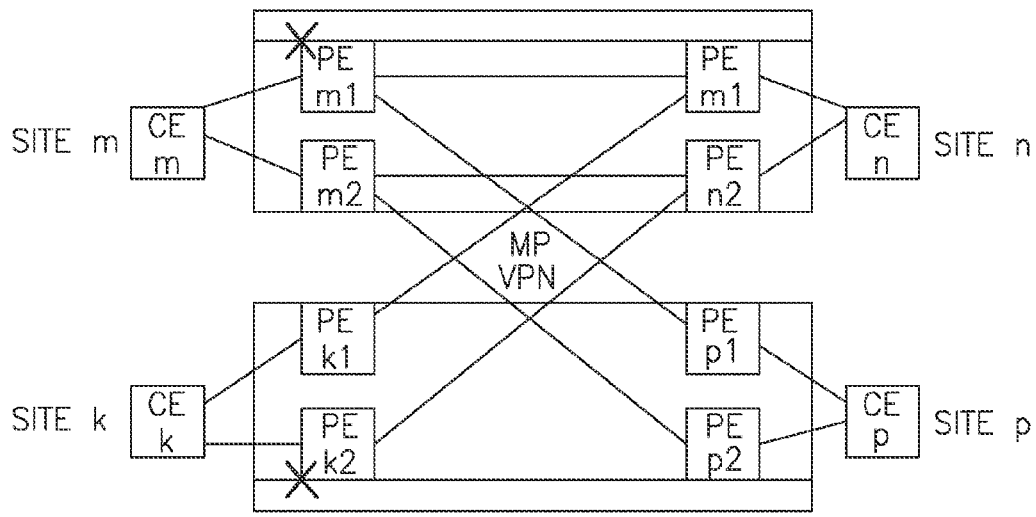
FIG. 4 shows some recoverable concurrent failures.
Figure 5:
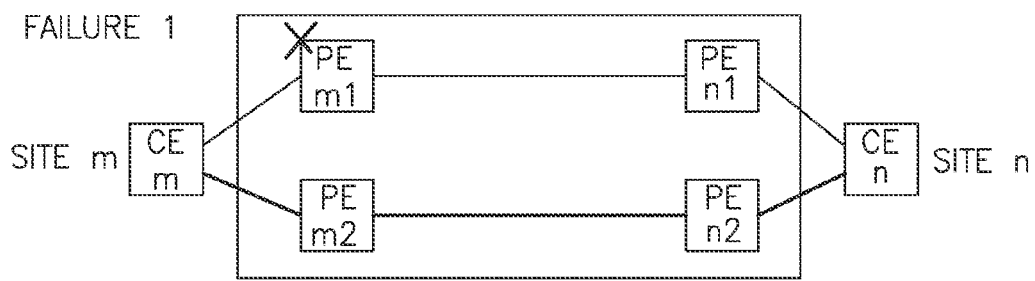
FIG. 5 illustrates a prior art arrangement solution.

- (A1) The topologies of FIG. 1 and FIG. 2 are supported, providing a L2 loop-free fully redundant PW connections for both P2P VPNs and MP VPNs. The partially redundant topology of FIG. 3 could be realized as a particular case of those of FIG. 1 and FIG. 2, using a transformation as follows (refer to FIG. 19):

Virtually subdividing PEn of FIG. 3 to two internal PEs: PEn1 and PEn2. Note, when PEn of FIG. 3 fails, both PEn1 and PEn2 would be assumed failed.

PEn1 (PEn2) will have the PW to PEm1 (PEm2), respectively, exactly as shown at FIG. 1 and FIG. 2.

The PW between PEn1 and PEn2 will be dummy (including the FI and RDI over it).

CEn will be dual homed to PEn1 and PEn2. Note, when CEn of FIG. 3 is single homed to PEn, then when CEn to PEn1 fails, CEn to PEn2 would be assumed as failed too, and vice versa.

▪ (A2) Redundant connections of the CE to PEs are concurrently used for carrying traffic, where the CE can apply load balancing. no CE-PE is normally forced to be inactive.

▪ (A3) No protocol is used between PEs nor between PEs and CEs to coordinate a loop-free path, other than the acceptable PW (or tunnel) OAM.

Figure 6:
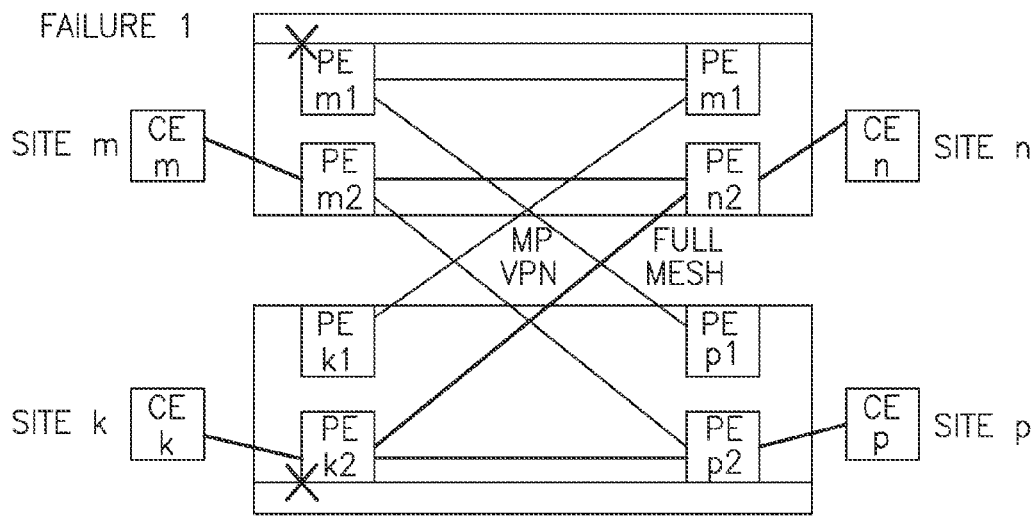
FIG. 6 presents a problem of the prior art arrangement.
Figure 10:
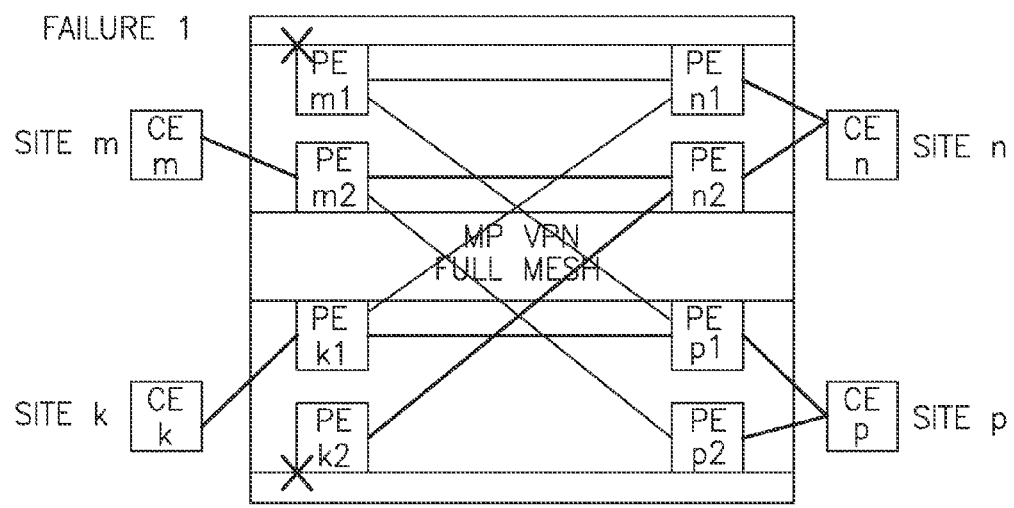
FIG. 10 shows an example for recovery of communication to sites m and k.

▪ (A4) A failure at one pair of sites does not prohibit recovery at another pair of sites of same MP VPN, nor does it affect remote CEs. This is achieved by using a dedicated set of redundant PWs per pair of sites, and leaving remote CEs unaware of failures. Unlike the prior art at FIG. 6, the site k would not be disconnected from sites n and p, as illustrated at FIG. 10, where only the P-PWs are shown.

▪ (A5) Recovery following a failure is automatic and can be fast, based on physical layer indications for CE to PE connection and OAM for PWs.

▪ (A6) The solution can be realized with either PWs or non-PW realizations.

FIG. 1 illustrates how partially redundant dual homing structure can be transformed into a fully redundant one. Using the above transformation, the scenarios for a partially redundant dual homing are similar to those described for the fully redundant dual homing.

FIG. 2 illustrates recovery of communication to sites m and k, the process which is also described with reference to FIG. 8.

Though the invention has been described based on the limited examples, it should be appreciated that other versions of the method may be proposed and should be considered part of the invention whenever defined by the claims which follow.

The invention claimed is:

1. A method for protecting traffic in a Layer 2 (L2) communication network between a first and a second local nodes (CE1, CE2) interconnected via a dual homed structure, wherein said structure comprises: four provider edge nodes PEs, four communication lines and four local connections, a first pair of the provider edge nodes (PEs A,C) being respectively connected by a first couple of local connections from among the four local connections (CE1-PEs A,C) to the first local node (CE1), a second pair of the provider edge nodes (PEs B,D) respectively connected by a second couple of local connections from among the four local connections (CE2-PEs B,D) to the second local node (CE2), two distant communication lines (P-PW) from among the four communication lines each interconnecting two provider edge nodes PEs belonging to different pairs, and two local communication lines (S-PW) from among the four communication lines each interconnecting two provider edge nodes PEs belonging to the same pair;

the method comprising the steps of:
a) in a fault-free state, carrying traffic from the first local node (CE1) to the second local node (CE2) by dividing it into two traffic flows at the first local node (CE1) and respectively carrying the two flows via the first couple of local connections, via the provider edge nodes PEs of said first pair, via said two distant communication lines, via the provider edge nodes (PEs) of said second pair, and via the second couple of local connections, while carrying said two flows via both the provider edge nodes (PEs) of said second pair;

b) in a faulty state, when a failure occurs in at least one element of a group comprising a local connection (CE1-PE) and a provider edge node (PE):

propagating Layer 2 fault indications (L2 OAM tools) in the dual homed structure and processing thereof at the PEs so that as a result of said failure, the failed element, the remaining element of the group associated with it and also the local and the distant communication lines associated with said PE element of the group become blocked for said two traffic flows in the dual homed structure, while a specific one of said first and second local nodes CE1 and CE2, being remote from the failure, remains unaware of the failure;

performing switching at the local node being closer to the failure, so that both said two flows are directed to unblocked members of the dual homed structure, and rearranging said traffic flows based on the physical and said Layer 2 fault indications, so as to bypass all said blocked members of the dual homed structure by utilizing the remaining ones to carry both of said two flows, while both of the flows, arriving from the first local node (CE1) to the second local node (CE2) upon the mentioned failure, pass through both provider edge node (PEs) associated with the second local node (CE2) in case they are both functional, thereby allowing the PEs associated with the second local node to learn MAC addresses sent by CE1.

2. The method according to claim 1, comprising carrying the two traffic flows in the fault-free state in mutually opposite directions via the local communication line (S-PW) between the nodes (PEs) of said second pair, so as said PEs of the second pair both learn the MAC addresses sent by the CE1.

3. The method according to claim 1, wherein the communication network is VPLS or Ethernet-VLAN.

4. The method according to claim 1, wherein said two distant communication lines and said two local communication lines are pseudo wires (PWs) or Ethernet-VLANs.

5. The method according to claim 1, comprising performing load balancing at the CE1s when carrying the two traffic flows via the first couple of local connections.

6. The method according to claim 1, where the L2 fault indications in the form of OAM tools reflect failures of the dual homing structure and are processed at L2 by said PEs.

7. The method according to claim 1, wherein MAC address learning is performed as follows: in the fault free state, a provider edge node PE receiving a new MAC address from a local communication line (S-PW) learns said address and associates the address with its suitable distant communication line (P-PW), wherein the association is performed: either by listing the address as if it was learned from said distant communication line (P-PW), or by listing the address as if it was learned from the local communication line (S-PW), but actually forwarding traffic as if packet was learned from the P-PW, while the PE flushes MAC addresses whenever a fault indication (FI) received over the S-PW changes from fault-state to fault free and vice versa.

8. The method according to claim 7, wherein in case said provider edge node (PE) receives fault indications (FI) over its local communication line (S-PW), it starts associating new MAC addresses arriving from said S-PW with its close local node (CE).

9. A method for protecting traffic in a Layer 2 (L2) communication network between a first and a second local nodes (CE1, CE2) interconnected via a dual homed structure, wherein said structure comprises: four provider edge nodes PEs, four communication lines and four local connections, a first pair of the provider edge nodes (PEs A,C) being respectively connected by a first couple of local connections from among the four local connections (CE1-PEs A,C) to the first local node (CE1), a second pair of the provider edge nodes (PEs B,D) respectively connected by a second couple of local connections from among the four local connections (CE2-

PEs B,D) to the second local node (CE2), two distant communication lines (P-PW) from among the four communication lines each interconnecting two provider edge nodes (PEs) belonging to different pairs, and two local communication lines (S-PW) from among the four communication lines each interconnecting two provider edge nodes PEs belonging to the same pair, wherein, in a fault-free state, the method comprises carrying traffic from the first local node (CE1) to the second local node (CE2) by dividing it into two traffic flows at the first local node (CE1) and respectively carrying the two flows via the first couple of local connections, via the provider edge nodes (PEs) of said first pair, via said two distant communication lines, via the provider edge nodes (PEs) of said second pair, and via the second couple of local connections, while carrying two said flows via both the provider edge nodes (PEs) of said second pair, and
   wherein in case of failure in one of the distant communication lines, said distant communication line becomes blocked for said two traffic flows, and the method comprises:
   rearranging said two traffic flows based on the physical and said Layer 2 fault indications so as to bypass said blocked distant communication line by utilizing the remaining one to carry both of said flows, and
   passing both of the flows arriving from the first local node (CE1) to the second local node upon the mentioned failure, through both provider edge node (PEs) associated with the second local node (CE2), in case both of said PEs are functional, thereby allowing said PEs to learn shared MAC addresses.

* * * * *